United States Patent
Sherwin et al.

(10) Patent No.: US 6,655,709 B2
(45) Date of Patent: Dec. 2, 2003

(54) STEER-BY-WIRE STEERING APPARATUS WITH ACTUATABLE MECHANISM

(75) Inventors: Kenneth A. Sherwin, West Lafayette, IN (US); Robert T. Ducharme, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/059,983

(22) Filed: Jan. 29, 2002

(65) Prior Publication Data

US 2003/0141134 A1 Jul. 31, 2003

(51) Int. Cl.$^7$ ................................................. B62D 5/04
(52) U.S. Cl. ...................... 280/402; 280/404; 280/430
(58) Field of Search ............................... 180/402, 405, 180/430, 404

(56) References Cited

U.S. PATENT DOCUMENTS

| | | | | |
|---|---|---|---|---|
| 5,275,250 A | * | 1/1994 | Muller et al. ............... | 180/402 |
| 5,511,629 A | | 4/1996 | Vogel | |
| 6,442,462 B1 | * | 8/2002 | Nishizaki et al. ............. | 701/41 |

FOREIGN PATENT DOCUMENTS

| | | | | |
|---|---|---|---|---|
| DE | 19841913 A1 | * | 3/2000 | ............ B62D/5/30 |
| DE | 10015923 A1 | * | 10/2001 | ............ B62D/5/30 |
| DE | 10042308 A1 | | 11/2001 | |
| JP | 2002225733 A | * | 8/2002 | ............ B62D/5/04 |

\* cited by examiner

*Primary Examiner*—Kevin Hurley
(74) *Attorney, Agent, or Firm*—Tarolli, Sundheim, Covell & Tummino L.L.P.

(57) ABSTRACT

A steering apparatus (10) for turning steerable wheels of a vehicle in response to rotation of a vehicle steering wheel (12) comprises a first assembly (16), a second assembly (26), and a mechanism (108). The first assembly (16) is operatively coupled to the steering wheel (12) and includes components (18 and 22) for monitoring applied torque and angular rotation of the steering wheel. The second assembly (26) includes a steering gear (34) and components (28 and 30) for receiving the first signal and actuating the steering gear (34) in response to the first signal. The mechanism (108) when in a first mode of operation provides a mechanical connection between the steering wheel (12) and the steering gear (34). When the mechanism (108) is in the second mode of operation, the steering wheel (12) and the steering gear (34) lack a mechanical connection.

8 Claims, 4 Drawing Sheets

STEER-BY-WIRE STEERING APPARATUS WITH ACTUATABLE MECHANISM

TECHNICAL FIELD

The present invention relates to a steering apparatus for turning the steerable wheels of a vehicle in response to rotation of a vehicle steering wheel.

BACKGROUND OF THE INVENTION

Power steering gears are common in modern vehicles. Typically, one or more rigid shafts connect a vehicle steering wheel to an input shaft of the power steering gear. The rigid shafts must be routed from the vehicle steering wheel to the input shaft of the power steering gear. Routing the rigid shafts between the steering wheel and the steering gear is often difficult, as other vehicle components must not interfere with the shafts.

Some known vehicle steering systems have eliminated the rigid shafts. Such systems are commonly referred to as "steer-by-wire" systems. In steer-by-wire systems, there is no mechanical connection between the steering wheel and the steering gear. Instead, an assembly associated with the steering wheel sends an electronic signal to an assembly associated with the steering gear. The electronic signal actuates the steering gear. Since steer-by-wire systems have no mechanical connection, routing of the rigid shafts between the steering wheel and the steering gear is avoided. However, with no mechanical connection, steering control of the vehicle is lost if the steer-by-wire system fails.

SUMMARY OF THE INVENTION

The present invention is a steering apparatus for turning steerable wheels of a vehicle in response to rotation of a vehicle steering wheel. The apparatus comprises a first assembly, a second assembly, and a mechanism. The first assembly is operatively coupled to the steering wheel. The first assembly includes components for monitoring applied torque and angular rotation of the steering wheel and for transmitting a first signal indicative of the applied torque and angular rotation of the steering wheel. The second assembly includes a steering gear for, when actuated, turning the steerable wheels of the vehicle and components for receiving the first signal and actuating the steering gear in response to the first signal. The mechanism has first and second modes of operation. The mechanism, when in the first mode of operation, provides a mechanical connection between the steering wheel and the steering gear for enabling manual actuation of the steering gear. When the mechanism is in the second mode of operation, the steering wheel and the steering gear lack a mechanical connection for enabling manual actuation of the steering gear.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
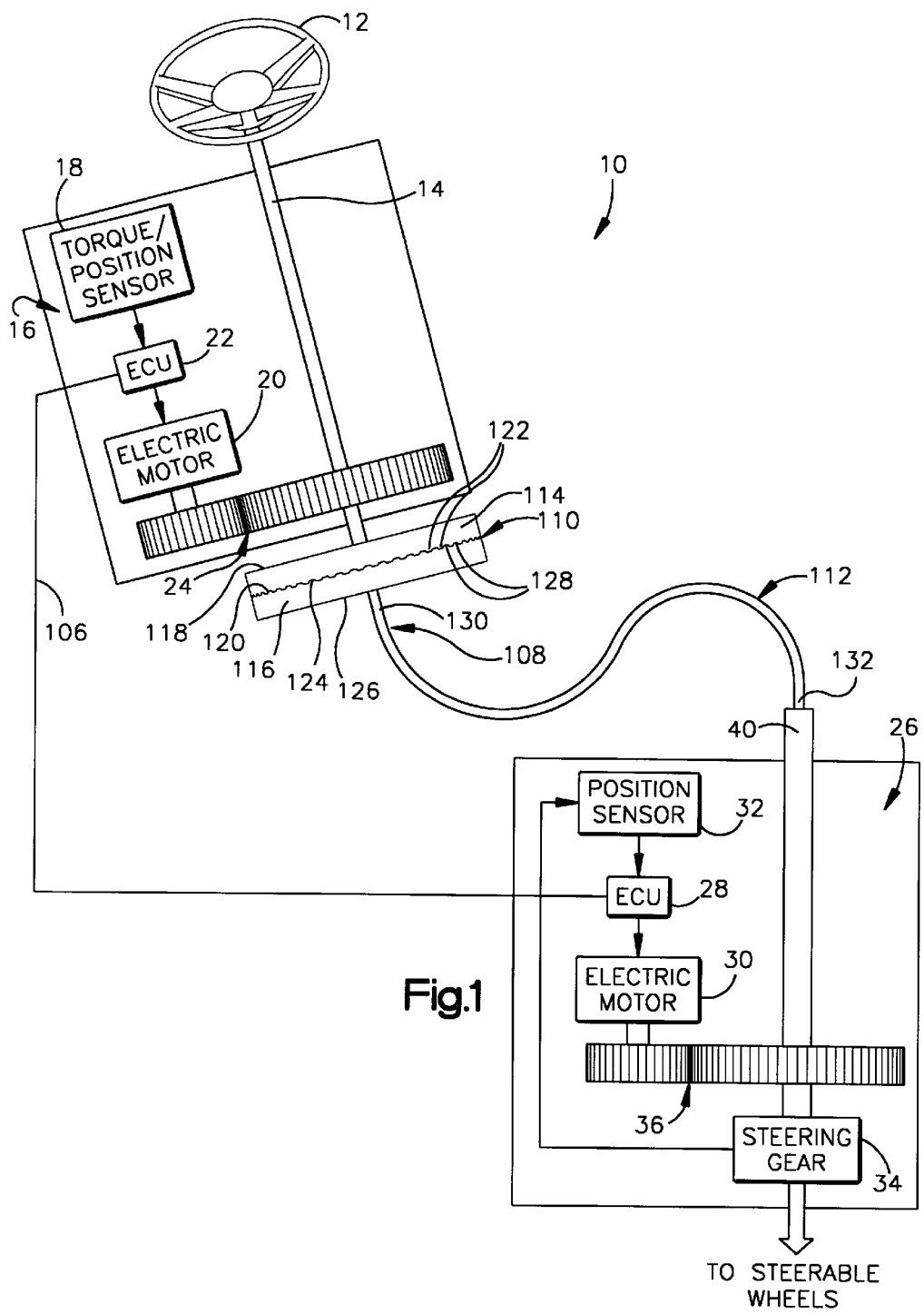
FIG. 1 is a schematic illustration of a vehicle steering apparatus constructed in accordance with the present invention in a condition providing a mechanical connection between a steering wheel and a steering gear.

FIG. 1 schematically illustrates a vehicle steering apparatus 10 constructed in accordance with the present invention. The vehicle steering apparatus 10 includes a vehicle steering wheel 12. The steering wheel 12 is of known construction and is manually rotatable by a vehicle operator.

A shaft 14 is fixed to the center or hub of the steering wheel 12. Angular rotation of the steering wheel 12 results in an equivalent angular rotation of the shaft 14. The shaft 14 extends from the steering wheel 12 through a first assembly 16.

The first assembly 16 is operatively coupled to the vehicle steering wheel 12 via the shaft 14. The first assembly 16 includes a torque/position sensor 18, a first electric motor 20, and a first electronic control unit 22. The first assembly 16 is integrated into a single unit through which the shaft 14 passes.

The torque/position sensor 18 of the first assembly 16, shown schematically in FIG. 1, is operable to sense operator applied torque and angular rotation of the steering wheel 12. The torque/position sensor 18 also generates signals indicative of the applied torque and angular rotation of the steering wheel 12. The torque/position sensor 18 may be any known sensor or group of sensors for sensing applied torque and angular rotation of the steering wheel 12 and for generating signals indicative of the sensed parameters. In one embodiment, the torque/position sensor 18 is an optical sensor of known construction.

The first electric motor 20 is connected to the shaft 14. Preferably, a gear assembly 24 connects an output of the first electric motor 20 to the shaft 14. The first electric motor 20 is actuatable to provide resistance to rotation of the steering wheel 12 and thus, is commonly referred to as a "steering feel motor."

The first electronic control unit 22 is operatively coupled to the torque/position sensor 18 and to the first electric motor 20. The first electronic control unit 22 receives the signals indicative of the applied torque and angular rotation of the steering wheel 12 from the torque/position sensor 18. In response to the signals from the torque/position sensor 18, the first electronic control unit 22 generates and transmits a first signal corresponding to the sensed torque and angular rotation of the steering wheel 12 sensed by the torque/position sensor 18.

The second assembly 26 includes a second electronic control unit 28, a second electric motor 30, a torque/position sensor 32, and a hydraulic power steering gear 34 for turning the steerable wheels (not shown) of the vehicle (not shown). Alternatively, an electric power steering gear may be used. If an electric power steering gear is used, the second electric motor 30 is eliminated and the electric motor of the electric power steering gear is controlled by the second electronic control unit 28 to turn the steerable wheels of the vehicle. The components of the second assembly 26 are integrated into a single unit.

The second electronic control unit 28 receives the first signal from the first electronic control unit 22. The second electronic control unit 28 is further operatively coupled to the second electric motor 30. The second electronic control unit 28 controls the operation of the second electric motor 30 in response to the first signal.

The second electric motor 30 has an output shaft that is connected with an input shaft 40 of the power steering gear 34. A gear assembly 36 may be used to connect the output shaft of the second electric motor 30 to the input shaft 40 of the power steering gear 34. The second electric motor 30, upon receiving a signal from the second electronic control unit 28, is operable to actuate the power steering gear 34.

Figure 3:
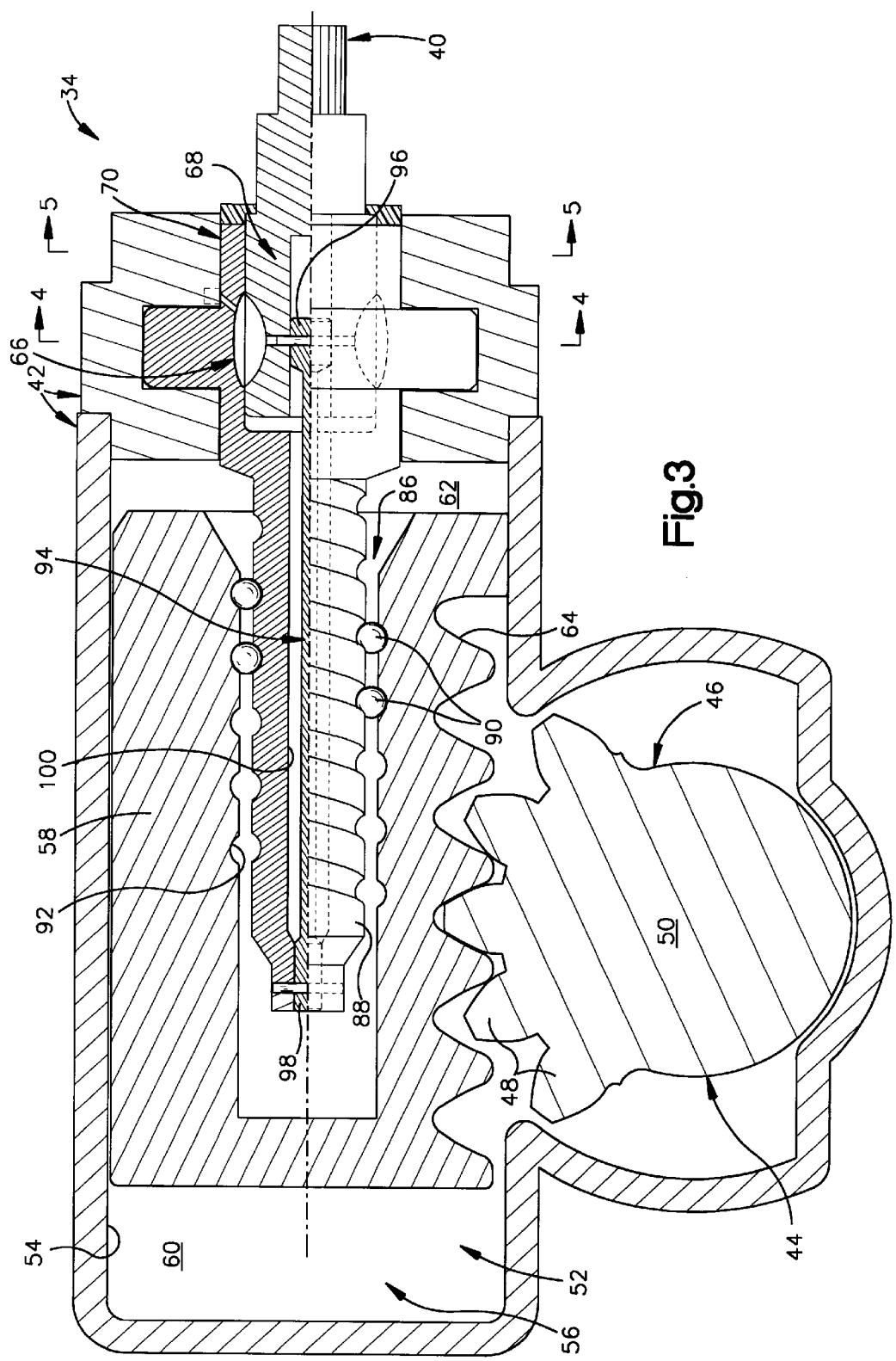
FIG. 3 is a schematic elevation view, partially in section, through the steering gear of the vehicle steering apparatus of FIG. 1.

The power steering gear 34 is an integral hydraulic power steering gear 34. Other steering gears are contemplated by this invention, such as rack and pinion steering gears and electric power steering gears. The integral hydraulic powered steering gear 34 is illustrated in FIG. 3.

The power steering gear 34 includes a housing 42 and a drive mechanism 44. The drive mechanism 44 is moved in response to rotation of the input shaft 40 of the power steering gear 34. Motion of the drive mechanism 44 results in a turning of the steerable wheels of the vehicle.

The drive mechanism 44 includes a sector gear 46 having a plurality of teeth 48. The sector gear 46 is fixed on an output shaft 50 that extends outwardly through an opening in the housing 42 of the power steering gear 34. The output shaft 50 is typically connected to a pitman arm (not shown) that is connected to the steering linkage (not shown) of the vehicle. Thus, as the sector gear 46 rotates, the output shaft 50 is rotated to operate the steering linkage. As a result, the steerable wheels of the vehicle are turned.

The power steering gear 34 further includes a hydraulic motor 52 for moving the drive mechanism 44. The hydraulic motor 52 is located within the housing 42 of the power steering gear 34. The housing 42 of the power steering gear 34 has an inner cylindrical surface 54 defining a chamber 56. A piston 58 is located within the chamber 56 and divides the chamber 56 into opposite chamber portions 60 and 62. One chamber portion 60 is located on a first side of the piston 58 and the other chamber portion 62 is located on a second side of the piston 58. The piston 58 creates a seal between the respective chamber portions 60 and 62 and is capable of axial movement within the chamber 56.

A series of rack teeth 64 is formed on the periphery of the piston 58. The rack teeth 64 act as an output for the hydraulic motor 52 and mesh with the teeth 48 formed on the sector gear 46 of the drive mechanism 44. When the piston 58 moves axially, the rack teeth 64 of the piston 58 interact with the teeth 48 of the sector gear 46 to rotate the sector gear 46.

A pump (not shown) supplies hydraulic fluid from a reservoir (not shown) to the hydraulic motor 52. Typically, the engine (not shown) of the vehicle drives the pump. However, the pump could be driven otherwise, such as by a dedicated electric motor. The pump forces hydraulic fluid into an inlet (not shown) of the housing 42. The inlet directs the flow of the fluid to a directional control valve 66.

The directional control valve 66 directs the fluid to an appropriate chamber portion 60 or 62 of the hydraulic motor 52. The flow of hydraulic fluid toward one of the chamber portions 60 or 62 increases the pressure within that chamber portion 60 or 62. When the pressure of one chamber portion 60 or 62 increases relative to the pressure of the other chamber portion 60 or 62, the piston 58 moves axially until the pressure within each chamber portion 60 or 62 again equalizes. As the piston 58 moves axially, the volume of one chamber portion 60 or 62 increases and the volume of the other chamber portion 60 or 62 decreases. The decreasing chamber portion 60 or 62 is vented to allow a portion of the fluid contained in the decreasing chamber portion 60 or 62 to escape. The escaping fluid exits the housing 42 via a return (not shown) and is directed into the reservoir.

Figure 4:
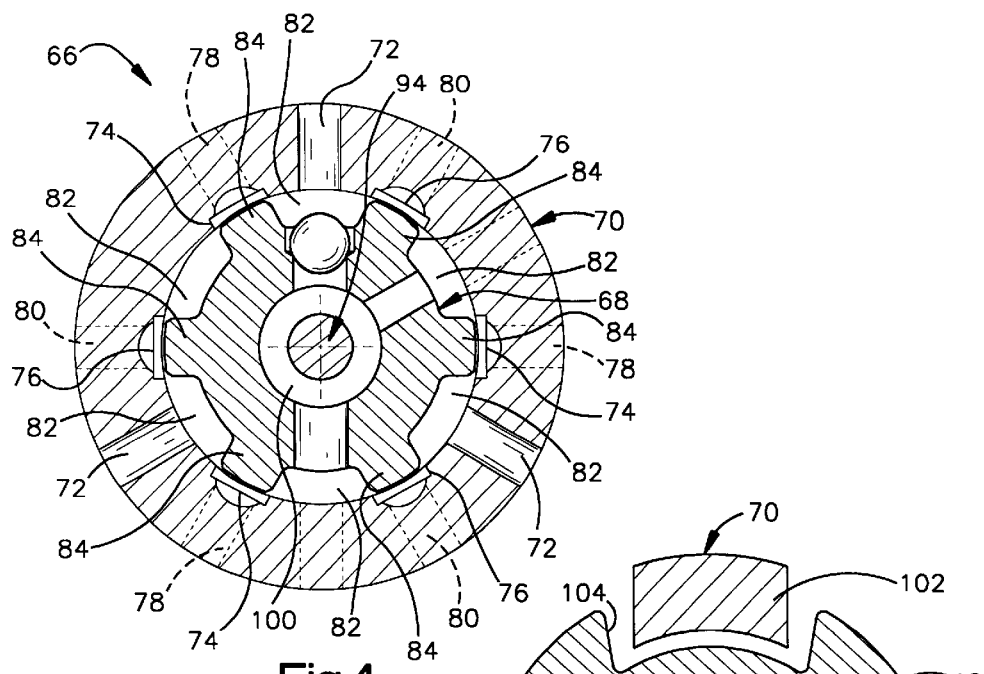
FIG. 4 is a cross-sectional view taken approximately along line 4—4 of FIG. 3.

An embodiment of the directional control valve 66 is shown in FIG. 4. The directional control valve 66 contains a valve core part 68 and a valve sleeve part 70. A portion of the valve core part 68 is contained within and is rotatable relative to the valve sleeve part 70.

The valve sleeve part 70 includes three radially directed passages 72 that extend from an outer circumference of the valve sleeve part 70 to an inner circumference of the valve sleeve part. Each of these radial passages 72 is supplied with hydraulic fluid that enters the housing 42 through the inlet. Two axially extending grooves 74 and 76 are associated with each radial passage 72. The axially extending grooves 74 and 76 are located on the inner circumference of the valve sleeve part 70. As shown in FIG. 4, one groove 76 is located clockwise from each radial passage 72 and one groove 74 is located counter-clockwise from each radial passage. The grooves 74 and 76 are equidistant from a respective radial passage 72. Each groove 74 leads to a passage 78 extending radially outwardly through the valve sleeve part 70. Each groove 76 leads to a passage 80 extending radially outwardly through the valve sleeve part 70. Each groove 74 and 76 and associated passage 78 and 80 is associated with a particular chamber portion 60 and 62 of the hydraulic motor 52. For example, with reference to FIG. 4, each groove 76 and associated passage 80 located immediately clockwise of a radial passage 72 will supply hydraulic fluid to chamber portion 62; whereas, each groove 74 and associated passage 78 located immediately counter-clockwise from a radial passage 72 will supply hydraulic fluid to chamber portion 60.

Six grooves 82 are located around the outer circumference of the valve core part 68. The valve core part 68 also includes six protrusions 84 or lands. A protrusion 84 separates adjacent grooves 82 on the outer circumference of the valve core part 68. Side walls of the protrusion 84 form side walls of the grooves 82.

When the valve core part 68 is located relative to the valve sleeve part 70 such that each protrusion 84 of the valve core part 68 is centered relative to a respective groove 74 or 76 of the valve sleeve part 70, the directional control valve 66 is in a neutral position. FIG. 4 illustrates the directional control valve 66 in the neutral position. In the neutral position, the pressure within each chamber portion 60 and 62 of the hydraulic motor 52 is the same so that the piston 58 is stationary. When the valve core part 68 is rotated relative to the valve sleeve part 70, access to one of the two associated grooves 74 or 76 of the valve sleeve part 70 is restricted by a protrusion 84 of the valve core part 68, while access to the other of the two associated grooves 74 or 76 is increased. This allows a greater amount of the hydraulic fluid to flow toward the open groove 74 or 76, resulting in an increase in pressure of the respective chamber portion 60 or 62 associated with that groove 74 or 76. As a result of the increased pressure within the respective chamber portion 60 or 62, the piston 58 of the hydraulic motor 52 is moved. For example, if the valve core part 68 is rotated clockwise as viewed in FIG. 4, the groove 74 of the valve sleeve part 70 located on the counter-clockwise side of the radial passage 72 becomes blocked and the groove 76 located on the clockwise side of the radial passage 72 becomes open. Thus, a greater amount of the hydraulic fluid is directed toward the open groove 76. Pressure in the chamber portion 62 of the hydraulic motor 52 associated with the open groove 76 is increased relative to the pressure in chamber portion 60. As a result, the piston 58 is moved in an axial direction and rotates the sector gear 46, causing the steerable wheels of the vehicle to be turned in the appropriate direction.

The piston 58 of the hydraulic motor 52 contains a bore 86 that is open toward the directional control valve 66. The valve sleeve part 70 and a follow-up member 88 form an integral one-piece unit that is supported for rotation relative to the piston 58 by a plurality of balls 90. The outer periphery of the follow-up member 88 is threaded. The plurality of balls 90 interconnects the threaded outer periphery of the follow-up member 88 with an internal thread 92 formed in the bore 86 of the piston 58. As a result of the interconnecting plurality of balls 90, axial movement of the piston 58 causes the follow-up member 88 and the valve sleeve part 70 to rotate. The rotation of the follow-up member 88 and the valve sleeve part 70 returns the directional control valve 66 to the neutral position.

Figure 5:
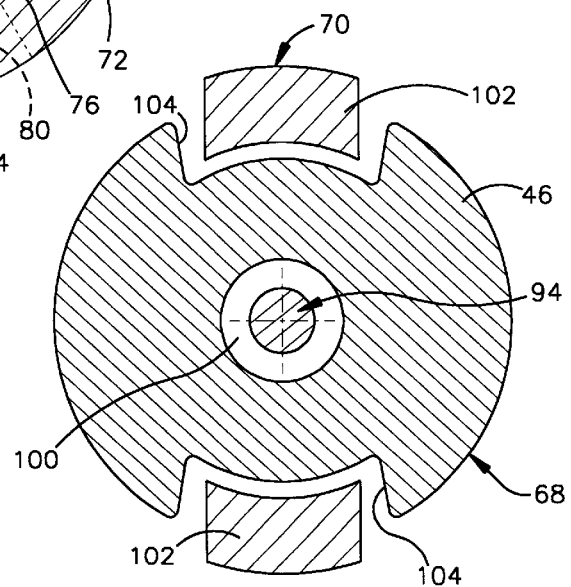
FIG. 5 is a cross-sectional view taken approximately along line 5—5 of FIG. 1.

The valve core part 68 of the directional control valve 66 is fixedly connected to an input shaft 40 (FIG. 3). A first end 96 of a torsion bar 94 is fixed relative to the input shaft 40 and the valve core part 68. A second end 98 of the torsion bar 94 is fixed relative to the valve sleeve part 70 and the follow-up member 88. At least a portion of the torsion bar 94 extends through an axially extending bore 100 in the valve core part 68, as shown in FIGS. 3–5.

When the resistance to turning of the steerable wheels of the vehicle is below a predetermined level, rotation of the input shaft 40 of the power steering gear 34 is transferred through the torsion bar 94 and causes rotation of the follow-up member 88. As a result, the directional control valve 66 remains in the neutral position. Rotation of the follow-up member 88 causes movement of the piston 58 and results in turning of the steerable wheels.

When resistance to turning the steerable wheels of the vehicle is at or above the predetermined level, rotation of the follow-up member 88 is resisted. As a result, rotation of the input shaft 40 of the power steering gear 34 rotates the first end 96 of the torsion bar 94 relative to the second end 98 of the torsion bar. The rotation of the first end 96 of the torsion bar 94 relative to the second end 98 of the torsion bar applies torsion across the torsion bar 94 and causes the valve core part 68 to rotate relative to the valve sleeve part 70.

As discussed above, when the valve core part 68 rotates relative to the valve sleeve part 70, hydraulic fluid is directed toward one of the chamber portions 60 and 62. As a result, the piston 58 moves within the chamber 56. Movement of the piston 58 results in turning of the steerable wheels of the vehicle, as well as, rotation of the follow-up member 88. As discussed above, rotation of the follow-up member 88 rotates the valve sleeve part 70 until the directional control valve 66 is again in the neutral position. When the directional control valve 66 is in the neutral position, the torsion across the torsion bar 94 is removed and the first end 96 of the torsion bar 94 is no longer rotated relative to the second end 98 of the torsion bar.

As shown in FIG. 5, the valve sleeve part 70 also includes first and second lugs 102 that are disposed in diametrically opposed cut-outs 104 in the valve core part 68. Upon rotation of the valve core part 68 of between 2° and 8° relative to the valve sleeve part 70, the lugs 102 of the valve sleeve part 70 engage the cut-outs 104 in the valve core part 68 to cause the valve sleeve part 70 to be rotated along with the valve core part 68. Such rotation of the valve sleeve part 70 causes the piston 58 to move within the chamber 56 and, hence, allows for the steerable wheels of the vehicle to be turned by the turning of the input shaft 40 of the power steering gear 34. Thus, even if a loss in hydraulic fluid pressure has occurred, turning the input shaft 40 of the power steering gear 34 enables the turning of the steerable wheels of the vehicle.

Figure 2:
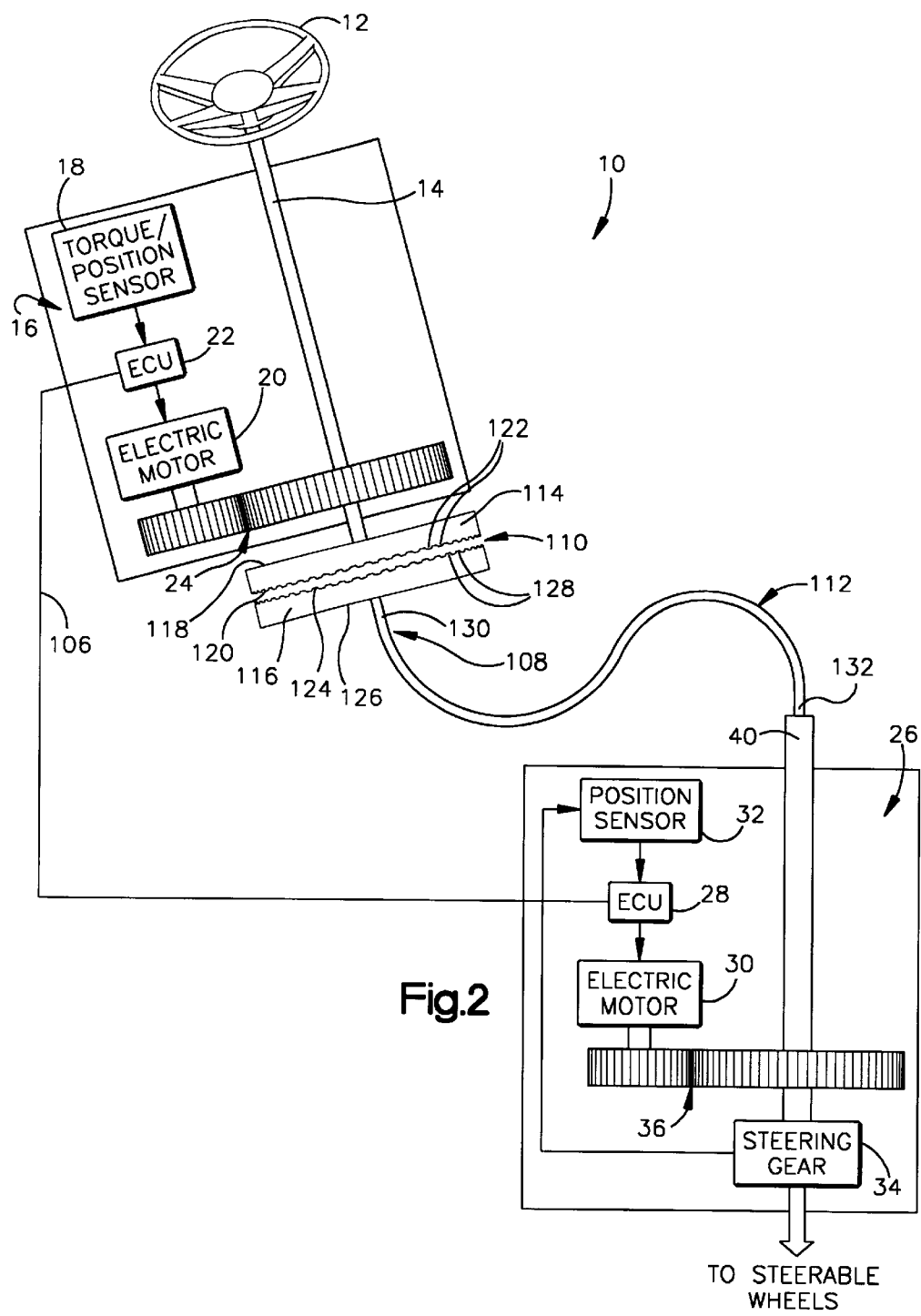
FIG. 2 is a schematic illustration of a vehicle steering apparatus constructed in accordance with the present invention in a condition without a mechanical connection between the steering wheel and the steering gear.

As shown schematically in FIGS. 1 and 2, the second assembly 26 also includes at least one position sensor 32 for sensing rotation of the output shaft 50 of the drive mechanism 44 of the power steering gear 34. The position sensor 32 is preferably a non-contacting position sensor. Upon sensing the rotation of the output shaft 50, the position sensor 32 generates a signal indicative of the rotation of the output shaft 50.

The second electronic control unit 28 receives the position signal from the position sensor 32. The second electronic control unit 28 is operable to generate and transmit a second signal corresponding to the position of the output shaft 50 of the drive mechanism 44 of the power steering gear 34 that the position sensor 32 sensed.

In the illustrated embodiment, the first electronic control unit 22 is electrically connected to the second electronic control unit 28 by a communication wire 106. The communication wire 106 transfers the first signal generated by the first electronic control unit 22 to the second electronic control unit 28 and also transfers the second signal generated by the second electronic control unit 28 to the first electronic control unit 22. In one embodiment, the communication wire 106 is a fiber optic cable and the first and second signals are optical signals. Alternatively, other forms of communication between the first electronic control unit 22 and the second electronic control unit 28 are contemplated by the present invention. For example, wireless communication or hard wiring between the first and second electronic control units 22 and 28 may be used.

The first electronic control unit 22 receives the second signal. In response to the second signal, the first electronic control unit 22 controls the first electric motor 20 to control the steering resistance applied to the steering wheel 12. The first electronic control unit 22 may run a known algorithm that uses the second signal and vehicle speed as parameters to determine the amount of resistance to apply to the steering wheel 12. The first electric motor 20, through the gear assembly 24, applies a force to the shaft 14 to resist rotation of the steering wheel 12.

The steering apparatus 10 also includes a mechanism 108. The mechanism 108 includes a clutch 110 and a flexible cable 112, as is illustrated in FIGS. 1 and 2. The mechanism 108 includes two modes of operation. In the first mode of operation, illustrated in FIG. 1, the mechanism 108 mechanically connects the steering wheel 12 to the input shaft 40 of the power steering gear 34. In the second mode of operation, illustrated in FIG. 2, the mechanism 108 does not mechanically connect the steering wheel 12 to the input shaft 40 of the power steering gear 34 and a mechanical connection between the steering wheel 12 and the steering gear 34 is lacking.

The clutch 110 of the mechanism 108 is a known device for engaging and disengaging members. The clutch 110 illustrated schematically in FIGS. 1 and 2 includes first and second members 114 and 116, respectively. The first member 114 includes an upper surface 118 and a lower surface 120. The upper surface 118 of the first member 114 is fixed relative to the shaft 14 opposite the steering wheel 12. A lower surface 120 of the first member 114 includes a plurality of teeth 122.

The second member 116 also includes an upper surface 124 and a lower surface 126. The upper surface 124 of the second member 116 includes a plurality of teeth 128 for meshingly engaging teeth 122 of the first member 114. The lower surface 126 of the second member 116 is fixed to the flexible cable 112.

The second member 116 of the clutch 110 is supported relative to and is biased toward the first member 114. A device (not shown) that forms a part of the clutch 110 is coupled to the second member 116 for moving the second member 116 out of engagement with the first member 114. The device may be an electric solenoid, a pneumatic cylinder, or any other known device for moving the second member 116 out of engagement with the first member 114. The clutch 110 is normally closed, meaning that when the device for moving the second member 116 out of engagement is not actuated, the first member 114 is in meshing engagement with the second member 116.

The clutch 110 is coupled to a power source (not shown). Preferably, the power source is the vehicle battery or air supply. When the clutch 110 receives electric, pneumatic, or other energy from the power source, the device for disengaging the second member 116 from the first member 114 is actuated and, the second member 116 is moved out of meshing engagement with the first member 114.

When the clutch 110 is engaged, rotation of the steering wheel 12 results in rotation of the second member 116. When the clutch 110 is disengaged, the second member 116 is not rotated by rotation of the steering wheel 12.

Figure 6:
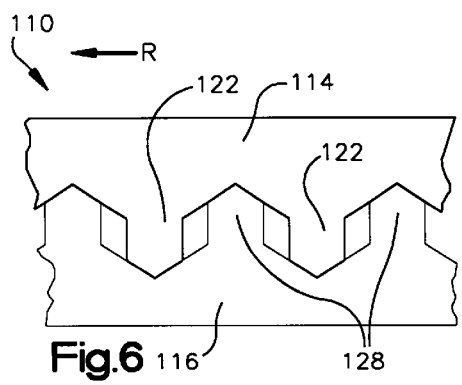
FIG. 6 is a schematic illustration of a portion of a clutch of the vehicle steering apparatus of FIG. 1 shown in a first condition of engagement.

FIG. 6 schematically illustrates a portion of the clutch 110 with the first member 114 in engagement with the second member 116. When the clutch 110 is engaged, angled portions of the teeth 122 of the first member are received in angled portions of the second member 116 and angled portions of the teeth 128 of the second member are received in angled portions of the first member, as shown in FIG. 6 during rotation in the direction R. This engagement of the first and second members 114 and 116 is sufficient to actuate the steering gear 34 of the second assembly 26. This condition of the clutch 110 may occur, for example, when a portion of the first assembly 16 is not operating properly but the second assembly 26 is operating properly.

Figure 7:
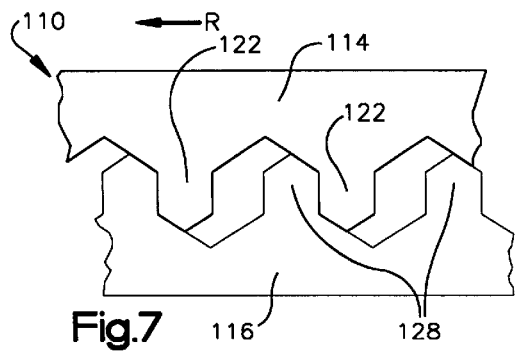
FIG. 7 is a schematic illustration of a portion of a clutch of the vehicle steering apparatus of FIG. 1 shown in a second condition of engagement.

However, if the second assembly 26 fails to operate properly, excessive torque levels may be required for turning the steerable wheels. As a result, the torque levels that must be transferred through the clutch 110 increase. The increased torque levels result in the first and second members 114 and 116 of the clutch 110 rotating relative to one another so that portions of the teeth 122 and 128 that extend perpendicular to the direction of rotation R contact one another, as shown in FIG. 7. The relative rotation results in a feel of looseness or play in the steering wheel 12. The looseness gives the operator a physical indication that maintenance or repairs to the apparatus 10 may be necessary.

The flexible cable 112 of the mechanism 108 includes a first end portion 130 and a second end portion 132. The first end portion 130 of the flexible cable 112 is fixed to the second member 116 of the clutch 110 and is rotatable with rotation of the second member 116. The second end portion 132 of the flexible cable 112 is fixed to the input shaft 40 of the steering gear 34.

The flexible cable 112 is preferably a braided steel cable. Although radially flexible, the flexible cable 112 has a high torsional rigidity. The flexibility allows the flexible cable 112 to be easily routed between the first assembly 16 and the second assembly 26 by allowing the flexible cable 112 to be routed around and through vehicle components that would interfere with a rigid connection. The flexible cable 112 also allows the steering gear 34 to be mounted on a portion of the vehicle that is movable relative to the steering wheel 12. The high torsional rigidity of the flexible cable 112 causes the second end portion 132 of the flexible cable 112 to rotate when the first end portion 130 of the flexible cable 112 is rotated.

During normal operation of the steering apparatus 10, power is supplied to the clutch 110. As a result, the second member 116 of the clutch 110 is disengaged from the first member 114 of the clutch and the mechanism 108 is in the second mode of operation, as is illustrated in FIG. 2. When the mechanism 108 is in the second mode of operation, the steering apparatus 10 is steered-by-wire and there is no mechanical connection between the steering wheel 12 and the steering gear 34. It is noted that when the clutch 110 is disengaged, rotation of the input shaft 40 of the power steering gear 34 will rotate the second member 116 of the clutch 110. However, since the clutch 110 is disengaged, rotation of the second member 116 will not cause rotation of the steering wheel 12.

In the event of a failure that causes the steer-by-wire operation of the steering apparatus 10 to automatically shutdown or in the event of a purposeful disengagement of the steer-by-wire operation, the second member 116 of the clutch 110 moves into meshing engagement with first member 114 of the clutch. Thus, the mechanism 108 is in the first mode of operation and a mechanical connection is created between the steering wheel 12 and the steering gear 34, as is illustrated in FIG. 1. When the mechanism 108 is in the first mode of operation, rotation of the steering wheel 12 is transferred through the clutch 110 and the flexible cable 112 to the input shaft 40 of the steering gear 34 to enable manual actuation of the power steering gear 34. The mechanical connection also enables manual turning of the steerable wheels of the vehicle if the lugs 102 of the valve sleeve part 70 contact the valve core part 68.

Alternatively, the clutch 110 may be operatively coupled to the first electronic control unit 22. The first electronic control unit 22 may control the mode of operation of the mechanism 108 in response to the second signal from the second electronic control unit 28. For example, if in response to the second signal, the first electronic control unit 22 determines that the steering gear 34 is not being properly actuated in response to the first signal, the first electronic control unit may shutdown steer-by-wire operation and engage the first and second members 114 and 116 of the clutch 110 to enable manual actuation of the steering gear 34.

From the above description of the invention, those skilled in the art will perceive improvements, changes and modifications. For example, when operating with the clutch 110 engaged as a result of a hydraulic failure in steering gear 34, the electric motors 20 and 30 may combine their efforts to achieve a redundant power assist. Alternatively, either motor 30 or motor 20 may operate to provide a power assist.

Also, electric motor 20 may be operated such that its resistance torque increases dramatically as the steering gear 34 nears its mechanical end of travel. This increased resistance will signal the operator to stop turning the steering wheel 12 before fluid is shut off to valve 66, thus maintaining cooling fluid flow in the steering gear 34. Such improvements, changes and modifications within the skill of the art are intended to be covered by the appended claims.

Having described the invention, we claim the following:

1. A steering apparatus for turning steerable wheels of a vehicle in response to rotation of a vehicle steering wheel, the apparatus comprising:

a first assembly operatively coupled to the steering wheel, the first assembly including components for monitoring applied torque and angular rotation of the steering wheel and for transmitting a first signal indicative of the applied torque and angular rotation of the steering wheel;

a second assembly including a steering gear for, when actuated, turning the steerable wheels of the vehicle and components for receiving the first signal and actuating the steering gear in response to the first signal; and a mechanism having first and second modes of operation, the mechanism, when in the first mode of operation, providing a mechanical connection between the steering wheel and the steering gear for enabling manual actuation of the steering gear, when the mechanism is in the second mode of operation, the steering wheel and the steering gear lacking a mechanical connection for enabling manual actuation of the steering gear, the mechanism including a clutch have a first member and a second member, the second member being in meshing engagement with the first member when the mechanism is in the first mode of operation, the second member being disengaged from the first member when the mechanism is in the second mode of operation, the mechanism further including a flexible cable, the flexible cable being connected to one of the first and second members of the clutch.

2. The steering apparatus as defined in claim 1 wherein the flexible cable has a first end portion and a second end portion, rotation of the first end portion of the flexible cable resulting in rotation of the second end portion of the flexible cable.

3. The steering apparatus as defined in claim 1 wherein the flexible cable is a braided wire cable.

4. The steering apparatus as defined in claim 1 wherein the steering gear is hydraulically powered and the flexible cable attaches to an input shaft of the steering gear, rotation of the input shaft directing flow of fluid in the steering gear.

5. A steering apparatus for turning steerable wheels of a vehicle in response to rotation of a vehicle steering wheel, the apparatus comprising:

a first assembly operatively coupled to the steering wheel, the first assembly including components for monitoring applied torque and angular rotation of the steering wheel and for transmitting a first signal indicative of the applied torque and angular rotation of the steering wheel;

a second assembly including a steering gear for, when actuated, turning the steerable wheels of the vehicle and components for receiving the first signal and actuating the steering gear in response to the first signal; and a mechanism having first and second modes of operation, the mechanism, when in the first mode of operation, providing a mechanical connection between the steering wheel and the steering gear for enabling manual actuation of the steering gear, when the mechanism is in the second mode of operation, the steering wheel and the steering gear lacking a mechanical connection for enabling manual actuation of the steering gear, the mechanism including a clutch have a first member and a second member, the second member being in meshing engagement with the first member when the mechanism is in the first mode of operation, the second member being disengaged from the first member when the mechanism is in the second mode of operation, the meshing engagement between the first and second members of the clutch enabling a predefined amount of relative rotation between the first and second members so as to provide a physical indication of improper operation of portions of the apparatus.

6. The steering apparatus as defined in claim 5 wherein the first member includes a first plurality of teeth, each tooth of the first plurality of teeth having an angled end surface, the second member including a second plurality of teeth, adjacent teeth of the second plurality of teeth being separated by an angled recess, the angled end surface of each tooth of the first member being received in an associated angled recess in the second member when the first and second members are in meshing engagement.

7. The steering apparatus as defined in claim 6 wherein the first plurality of teeth of the first member are separated from the second plurality of teeth of the second member when the angled end surface of each tooth of the first member is received in the associated angled recess in the second member.

8. The steering apparatus as defined in claim 7 wherein the predefined amount of relative rotation between the first and second members results in engagement of a side surface of each tooth of the first plurality of teeth with a side surface of an associated tooth of the second plurality of teeth.

* * * * *